United States Patent
Lauret

(10) Patent No.: US 12,222,098 B2
(45) Date of Patent: Feb. 11, 2025

(54) ILLUMINATION SYSTEM WITH LENS PROJECTING ASYMMETRICAL LIGHT BEAM

(71) Applicant: GAGGIONE SAS, Montréal-la-Cluse (FR)

(72) Inventor: Jean-Pierre Lauret, Oyonnax (FR)

(73) Assignee: GAGGIONE SAS, Montreal-la-Cluse (FR)

( * ) Notice: Subject to any disclaimer, the term of this patent is extended or adjusted under 35 U.S.C. 154(b) by 0 days.

(21) Appl. No.: 17/912,368

(22) PCT Filed: Mar. 9, 2021

(86) PCT No.: PCT/FR2021/050399
§ 371 (c)(1),
(2) Date: Sep. 16, 2022

(87) PCT Pub. No.: WO2021/186123
PCT Pub. Date: Sep. 23, 2021

(65) Prior Publication Data
US 2024/0288146 A1    Aug. 29, 2024

(30) Foreign Application Priority Data
Mar. 17, 2020 (FR) .................... 20/02604

(51) Int. Cl.
*F21V 5/08* (2006.01)
*G02B 27/09* (2006.01)
*F21Y 115/10* (2016.01)

(52) U.S. Cl.
CPC ............ *F21V 5/08* (2013.01); *G02B 27/0972* (2013.01); *F21Y 2115/10* (2016.08)

(58) Field of Classification Search
CPC . F21V 5/08; F21V 5/045; F21V 5/005; G02B 5/045; G02B 27/0972
See application file for complete search history.

(56) References Cited

U.S. PATENT DOCUMENTS

| 709,849 | A | * | 9/1902 | De Man | .................... F21V 5/08 |
| | | | | | 359/593 |
| 818,208 | A | * | 4/1906 | Wadsworth | ............... E06B 9/24 |
| | | | | | 359/592 |

(Continued)

FOREIGN PATENT DOCUMENTS

| EP | 3369988 A1 | 9/2018 |
| WO | 2015110392 A1 | 7/2015 |
| WO | 2015183870 A1 | 12/2015 |

OTHER PUBLICATIONS

International Search Report for International Application No. PCT/FR2021/050399; Date of Completion: May 26, 2021; Date of Mailing: Jun. 9, 2021; 4 Pages.

(Continued)

*Primary Examiner* — Ismael Negron
(74) *Attorney, Agent, or Firm* — CANTOR COLBURN LLP

(57) ABSTRACT

A device for shaping a primary light beam, the shaping device including a plurality of shaping structures. Each shaping structure has at least one first optical surface configured to direct incident light beams in a desired direction, and a second optical surface configured to totally internally reflect incident light beams towards the first optical surface. An LED might provide the primary light beam, and includes collimating optics.

15 Claims, 4 Drawing Sheets

(56) References Cited

U.S. PATENT DOCUMENTS

| | | | | | |
|---|---|---|---|---|---|
| 2,844,998 | A | * | 7/1958 | Vincent | F21V 5/08 |
| | | | | | 359/593 |
| 4,411,493 | A | * | 10/1983 | Miller | F21V 5/04 |
| | | | | | 359/595 |
| 6,456,437 | B1 | * | 9/2002 | Lea | G02B 5/045 |
| | | | | | 359/627 |
| 8,162,513 | B2 | * | 4/2012 | Wei | G02B 5/045 |
| | | | | | 362/147 |
| 8,596,831 | B2 | * | 12/2013 | Saito | G02B 5/045 |
| | | | | | 362/326 |
| 9,920,903 | B2 | * | 3/2018 | Radl | F21V 5/045 |
| 10,731,823 | B2 | * | 8/2020 | Schickel | G02B 5/045 |
| 10,859,219 | B2 | * | 12/2020 | Butala | F21V 5/02 |
| 10,859,235 | B2 | * | 12/2020 | Fleszewski | F21V 5/08 |
| 10,926,889 | B2 | * | 2/2021 | Tsao | B64D 47/02 |
| 11,168,869 | B2 | * | 11/2021 | Pet | G02B 5/045 |
| 2019/0094557 | A1 | | 3/2019 | Xu et al. | |

OTHER PUBLICATIONS

Translation of International Search Report for International Application No. PCT/FR2021/050399; Date of Completion: May 26, 2021; Date of Mailing: Jun. 9, 2021; 2 Pages.
Written Opinion for International Application No. PCT/FR2021/050399; International Filing Date: Mar. 9, 2021; Date of Mailing: Jun. 9, 2021; 7 Pages.

* cited by examiner

[Fig. 1]
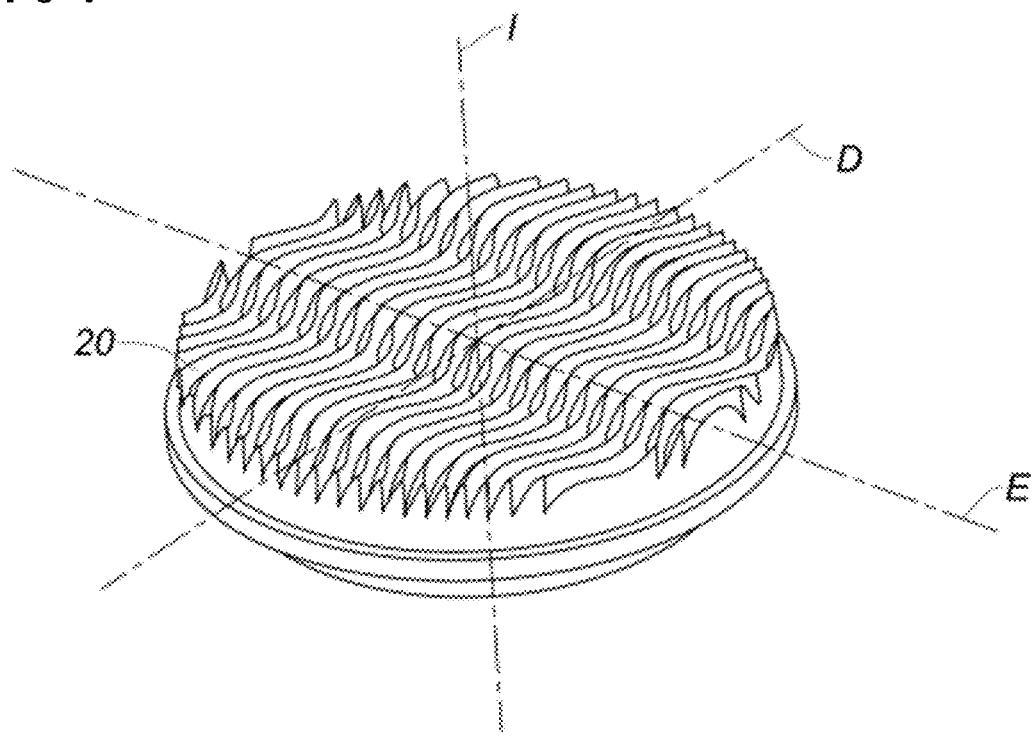
[Fig. 2]
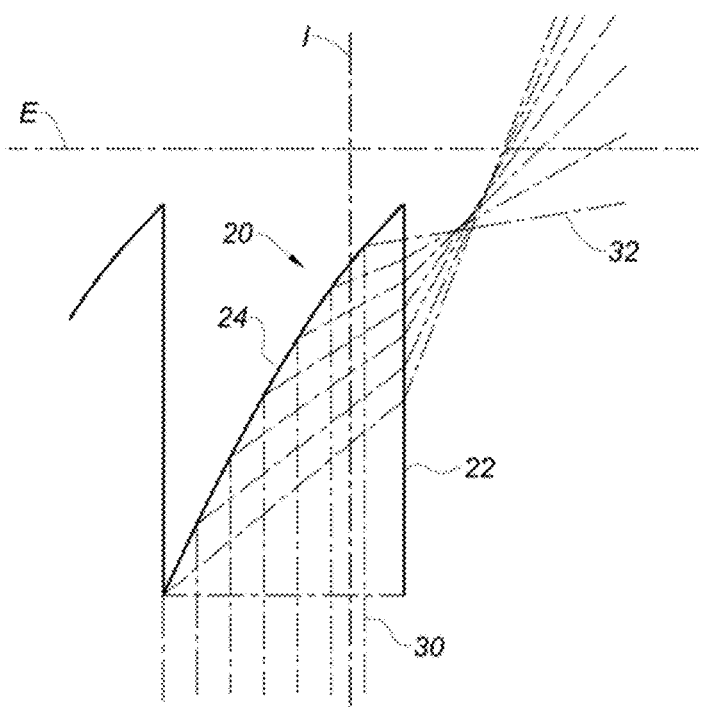

[Fig. 3]
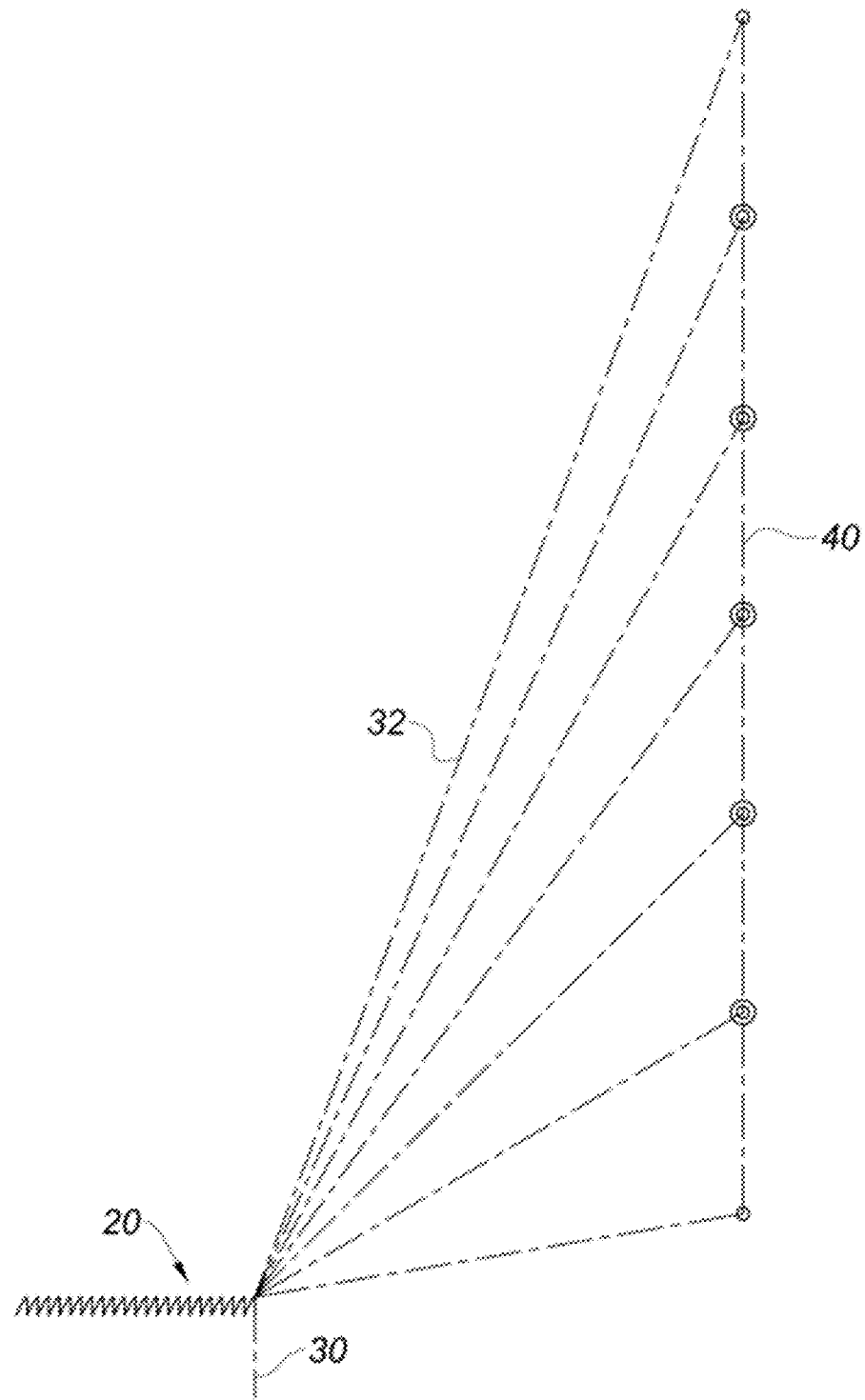

[Fig. 4]
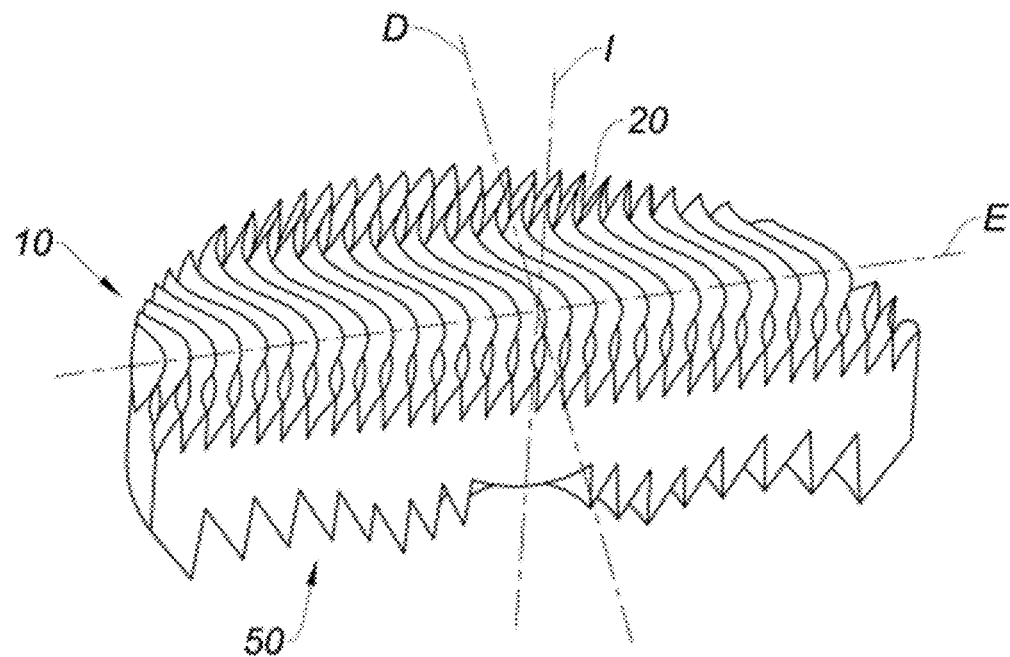
[Fig. 5]
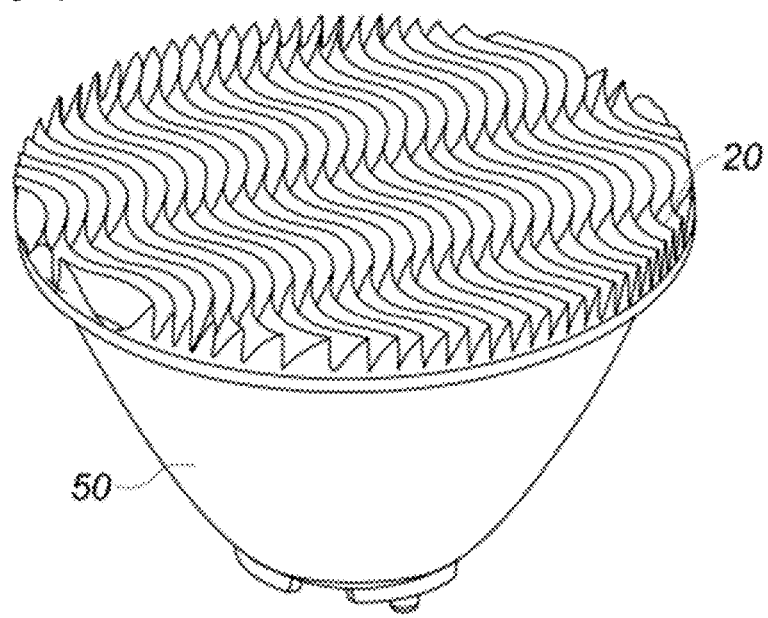

[Fig. 6]
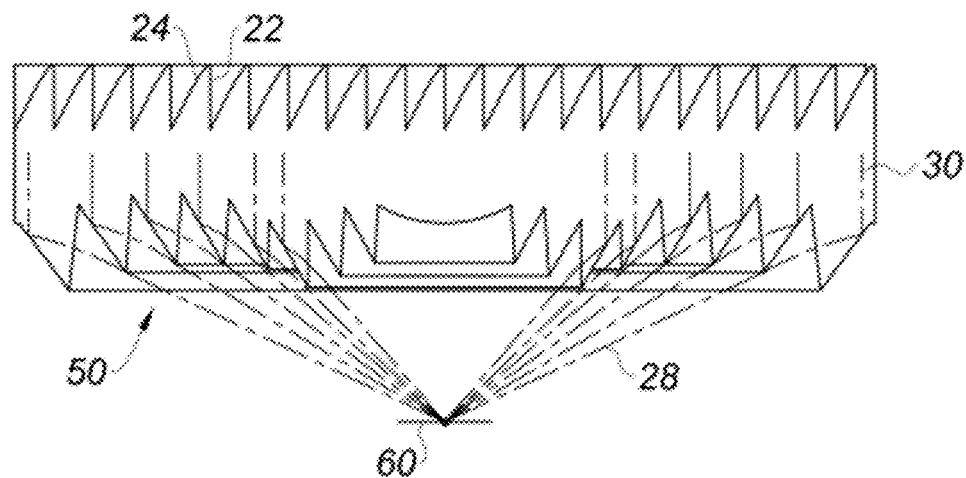
[Fig. 7]
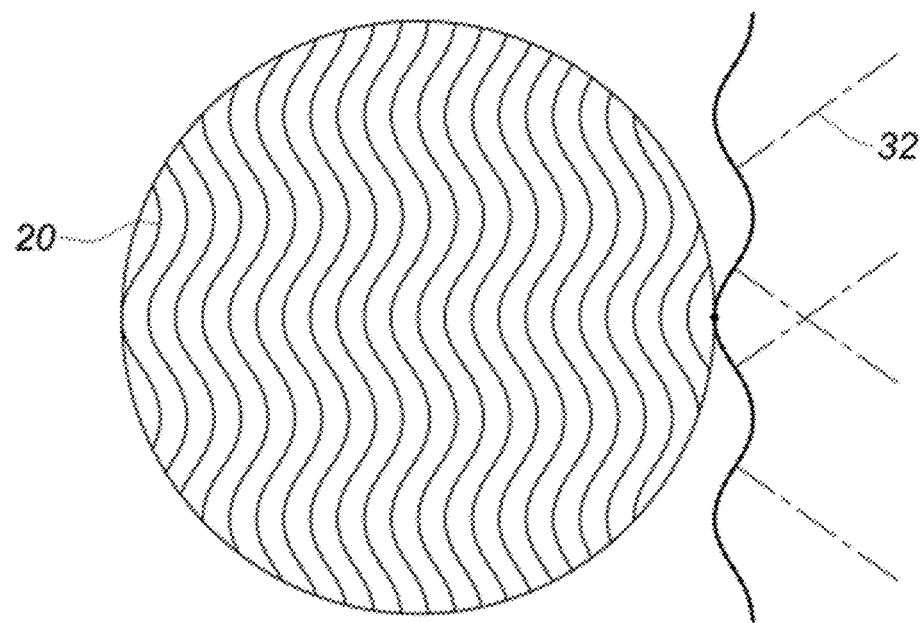

ILLUMINATION SYSTEM WITH LENS PROJECTING ASYMMETRICAL LIGHT BEAM

CROSS REFERENCE TO RELATED APPLICATIONS

This application is a National Stage of PCT Application No. PCT/FR2021/050399 filed on Mar. 9, 2021, which claims priority to French Patent Application No. 20/02604 filed on Mar. 17, 2020, the contents each of which are incorporated herein by reference thereto.

TECHNICAL FIELD

The present invention relates to an asymmetrical light beam illumination system. Such a system makes it possible to illuminate a flat or quasi-flat surface which is substantially parallel to the axis of the light source. Such a device is particularly suitable for illumination wall surfaces such as facades of buildings or posters for example.

BACKGROUND

In a known manner, the document EP3369988 presents a luminaire comprising a reflector taking the form of a shell adapted to obtain an emergent light beam having a component perpendicular to the light beam coming from a light source. In particular, the document EP3369988 describes reflective shells designed to irradiate a wall surface facing said reflective shells only with the reflected indirect light, while an unreflected direct light component of the light beam is limited to an opposite wall surface, from which the reflector shell faces, and/or is limited to the ground.

However, these solutions do not give complete satisfaction.

Indeed, the realization of the optical surface is particularly complex because the optical surface includes a very large number of micro-facets, which must be realized with a very low roughness and a very small edge radius at the joints. In addition, a system as described in the document EP3369988 has a large footprint not conducive to varied use. Finally, the solution proposed by EP3369988 requires metallization, which involves an additional step in manufacturing and therefore increased production costs.

The present invention aims to solve all or part of the drawbacks mentioned above.

BRIEF SUMMARY

To this end, the present disclosure relates to a device for shaping a primary light beam, such that the shaping device comprises a plurality of shaping structures, each shaping structure comprising at least one first optical surface configured to direct emergent beams in the direction of a wall to be illuminated such that at least two shaping structures among the plurality of shaping structures are configured to direct the respective emergent beams onto at least one common area of the wall to be illuminated, such that the shaping structures are regularly distributed along a spacing axis substantially perpendicular to an intermediate axis parallel to the primary light beam and extend longitudinally along an extension direction substantially perpendicular to the intermediate axis and to the spacing axis.

Such an arrangement allows a good homogeneity of the illumination of the wall to be illuminated. Indeed, such a diffusion device makes it possible to shape the beam originating from the collimator in a homogeneous manner on the wall to be illuminated.

Such an arrangement makes it possible to obtain a good homogeneity of the illumination of the wall to be illuminated and this independently of the quality of the beam originating from the collimator. Indeed, the wall to be illuminated being illuminated by the emergent beams emergent beams from at least two shaping structures, an average of the illumination is naturally applied and a good homogeneity is obtained.

Within the meaning of the present disclosure, substantially parallel means parallel to within 5°.

Within the meaning of the present disclosure, substantially parallel means parallel to within 20°.

Within the meaning of the present disclosure, substantially perpendicular means perpendicular to within 5°.

Within the meaning of the present disclosure, substantially perpendicular means perpendicular to within 20°.

Within the meaning of the present disclosure, a common area is any area of the wall to be illuminated.

Within the meaning of the present disclosure, a common area is an area included in an emission angle ranging from 1° to 89° such that the emission angle is the angle between the illumination plane defined by the wall to be illuminated and the emergent beam.

Within the meaning of the present disclosure, a common area is the entirety of the wall to be illuminated.

According to one embodiment, the shaping device is configured to shape the respective emergent beams over the entirety of the wall to be illuminated, such that the common area represents a part of said wall to be illuminated.

According to one embodiment, the primary light beam originates from a collimator.

According to one embodiment, the wall to be illuminated is disposed such that an illumination plane defined by said wall to be illuminated and an intermediate axis parallel to the primary light beam are substantially parallel.

According to one embodiment, the shaping structures of the plurality of shaping structures are identical.

Such an arrangement allows a good homogeneity of the illumination of the wall to be illuminated. Indeed, such a shaping device makes it possible to shape the beam originating from the collimator in a homogeneous manner on the wall to be illuminated, the homogeneity being obtained by an averaging effect between all the shaping structures.

According to one embodiment, each shaping structure comprises a second optical surface configured to realize total internal reflection of the primary light beam.

Such an arrangement makes it possible to obtain a large angle dynamics for the emergent beam. Indeed, the internal total reflection makes it possible to address a much wider angle dynamics than the refraction.

Such an arrangement allows shaping while maintaining a small footprint.

According to one embodiment, each shaping structure comprises a second optical surface configured to realize a transmission/refraction of the primary light beam.

According to one embodiment, at least one shaping structure comprises a second optical surface configured to realize a transmission/refraction of the beam to be diffused and at least one shaping structure comprises a second optical surface configured to realize an internal total reflection of the primary light beam.

According to one embodiment, the second optical surface is convergent. Indeed, such an arrangement makes it possible to prevent the light from one shaping structure from being directed towards another shaping structure. Otherwise the emergent beam would be intercepted by a neighboring shaping structure and would not be redirected towards the wall to be illuminated.

According to one embodiment, the first optical surface of each shaping structure defines an optical plane substantially parallel to the intermediate axis.

Such an arrangement allows a deviation angle ranging from 1° to 89°. Indeed, each light beam emerging from each shaping structure is therefore oriented so as not to illuminate the adjacent shaping structures.

According to one embodiment, the plurality of shaping structures comprises at least 10 shaping structures.

Such an arrangement makes it possible to obtain at least 10 emergent beams, one per shaping structure, and thus multiple portions of emergent beams are superimposed in order to obtain a homogeneous result on the wall to be illuminated, and this independently of the defects of distribution or homogeneity of the primary light beam.

According to one embodiment, the at least 10 shaping structures among the plurality of shaping structures are configured to shape the emergent beam on at least one common area of the wall to be illuminated.

According to one embodiment, each shaping structure of the plurality of shaping structures extends according to an elementary pattern.

Such an arrangement has the effect of spreading the light along the extension direction and thus makes it possible to avoid too high concentration of the light as well as too narrow common area.

According to one embodiment, the elementary pattern is substantially a B-spline.

According to one embodiment, the elementary pattern is substantially an arc of a circle.

According to one embodiment, the elementary pattern is substantially a conic.

According to one embodiment, the elementary pattern is repeated along the extension direction.

Such an arrangement has the effect of spreading the light along the extension direction more effectively and thus makes it possible to avoid too high concentration of the light as well as too narrow common area.

According to one embodiment, the elementary pattern is substantially sinusoidal.

Such an arrangement allows a better homogeneity of the light while allowing a wide common area.

According to one embodiment, each shaping structure of the plurality of shaping structures extends in a continuous manner.

Such an arrangement makes it possible to avoid the projections of light artifacts on the surface to be illuminated.

According to one embodiment, each shaping structure of the plurality of shaping structures extends in a discontinuous manner.

Within the meaning of the present disclosure, the term "extends in a continuous manner" means "forms a continuous curve".

According to one embodiment, each shaping structure of the plurality of shaping structures extends in a derivable manner.

Such an arrangement makes it possible to avoid the projections of light artifacts on the surface to be illuminated.

According to one embodiment, the derivative of the pattern is continuous.

According to one embodiment, each shaping structure of the plurality of shaping structures extends according to a non-derivable pattern. Such an arrangement facilitates the machining of the diffusion device.

Within the meaning of the present disclosure, the term "extends in a derivable manner" means "forms a continuous and derivable curve, with continuous derivative".

According to one embodiment, the shaping device comprises collimating optics configured to obtain the primary light beam from an incident light beam.

Such an arrangement makes it possible to obtain a complete and compact diffusion device.

By such an arrangement a zoom effect can be easily obtained. Indeed, a diffusion device according to the disclosure makes it possible to obtain an enlarged emergent beam by bringing closer a light source emitting the incident beam, or more generally by generating the primary beam by means of variable beam collimating optics.

According to one embodiment, the shaping device is made of polymethyl methacrylate, commonly called acrylic.

According to one embodiment, the shaping device is made of polycarbonate.

According to one embodiment, the shaping device is made of thermoplastic.

According to one embodiment, the shaping device is made of optical silicone.

According to one embodiment, the shaping device comprises a light source configured to provide the incident light beam.

According to one embodiment, the light source is a light-emitting diode.

According to one embodiment, the collimating optics and the plurality of shaping structures are formed from a single, one-piece mechanical part.

Such an arrangement makes it possible to simplify the manufacture of the device by having only one optical component to be assembled.

According to one embodiment, the plurality of shaping structures consists of a plurality of shaping sub-assemblies, with each shaping sub-assembly comprising a plurality of shaping structures such that at least two shaping sub-assemblies are configured to shape the emergent light beam on at least the common area of the wall to be illuminated.

Such an arrangement allows a good homogeneity of the illumination of the wall to be illuminated. Indeed, such a diffusion device makes it possible to shape the beam originating from the collimator in a homogeneous manner on the wall to be illuminated. Such an arrangement makes it possible to simplify the architecture of the elementary optical surfaces making up the sub-assemblies.

The various non-incompatible aspects defined above can be combined.

BRIEF DESCRIPTION OF FIGURES

The invention will be even better understood with the aid of the detailed description which is set out below with regard to the appended drawings in which:

FIG. 1 represents a sectional view of a shaping device in accordance with the present disclosure;

FIG. 2 represents a schematic view of a shaping structure in accordance with the present disclosure;

FIG. 3 represents a schematic view of a plurality of shaping structures as well as a wall to be illuminated in accordance with the present disclosure;

FIG. 4 represents one embodiment of a shaping device in accordance with the present disclosure;

FIG. 5 represents another embodiment of a shaping device in accordance with the present disclosure;

FIG. 6 represents a sectional view of a shaping device in accordance with the present disclosure; and FIG. 7 represents a top view of a shaping device in accordance with the present disclosure as well as the spreading of emergent beams through a shaping structure in accordance with the present disclosure.

DETAILED DESCRIPTION

As shown in FIGS. 1 and 2, the shaping device 10 is a device for shaping a primary light beam 30 originating from a collimator.

To this end, the shaping device 10 comprises a plurality of shaping structures 20 identical to each other and comprising at least 10 shaping structures 20. A shaping device 10 comprising a plurality of shaping structures 20 identical to each other, allows a good homogeneity of the illumination of the wall 40 to be illuminated. Indeed, such a shaping device makes it possible to shape the beam originating from the collimator in a homogeneous manner on the wall 40 to be illuminated, homogeneity being obtained by an averaging effect between all the shaping structures. In addition, such an arrangement makes it possible to obtain at least 10 emergent beams 32, one per shaping structure 20, and thus multiple portions of emergent beams 32 are superimposed in order to obtain a homogeneous result on the wall 40 to be illuminated, and this independently of defects in the distribution or homogeneity of the primary light beam 30.

According to one embodiment, the at least 10 shaping structures among the plurality of shaping structures are configured to shape the emergent beam on at least one common area of the wall to be illuminated.

Said plurality of shaping structures 20 comprising shaping structures 20 regularly distributed along a spacing axis E substantially perpendicular to an intermediate axis I parallel to the primary light beam 30 and extending longitudinally along an extension direction D substantially perpendicular to the intermediate axis and to the spacing axis. Such a configuration is particularly visible in FIGS. 1 and 4 for example. Within the meaning of the present disclosure, substantially perpendicular means perpendicular to within 5°.

Each shaping structure 20 comprises a first optical surface 22 and a second optical surface 24. The first optical surface 22 is configured to direct emergent beams 32 in the direction of a wall 40 to be illuminated so that at least two shaping structures 20 among the plurality of shaping structures 20 are configured to direct the respective emergent beams 32 onto at least one area of the wall 40 to be illuminated comprised within an emission angle ranging from 1° to 89° such that the emission angle is the angle between an illumination plane defined by the wall 40 to be illuminated and the emergent beam 32. Such an arrangement allows good homogeneity of the illumination of the wall to be illuminated. Indeed, such a diffusion device 10 makes it possible to shape the primary light beam 30 in a homogeneous manner on the wall to be illuminated. In addition, such an arrangement makes it possible to obtain good homogeneity of the illumination of the wall 40 to be illuminated and this independently of the quality of the primary light beam 30. Indeed, the wall 40 to be illuminated being illuminated by the emergent beams 32 originating from at least two shaping structures 20, an average of the illumination is naturally applied and a good homogeneity is obtained.

The second optical surface 24 is, for its part, configured to realize a total internal reflection of the primary light beam 30. Such an arrangement makes it possible to obtain a large angle dynamics for the emergent beam. Indeed, the internal total reflection makes it possible to address a much wider angle dynamics than the refraction. Such an arrangement also allows shaping while maintaining a small footprint. The second optical surface 24 is convergent. Indeed, it is necessary to use a second convergent optical surface 24 in order to prevent the light from a shaping structure 20 from being directed towards another shaping structure 20. Indeed, without this, the emergent beam 32 would be intercepted by a neighboring shaping structure 20 and would not be redirected towards the wall 40 to be illuminated.

However, according to another embodiment, each shaping structure 20 comprises a second optical surface configured to realize a transmission/refraction of the primary light beam 30.

According to one embodiment, the shaping device 10 is configured to shape the respective emergent light beam s 32 over the entirely of the wall to be illuminated, such that the common area represents a part of said wall 40 to be illuminated. Such an arrangement makes it possible to obtain more intense illumination on the common area than on the rest of the wall 40 to be illuminated. Such a configuration is particularly visible in FIG. 3 for example.

Such an arrangement also makes it possible to obtain a shaping device 10 capable of illuminating a wall 40 to be illuminated disposed in such a way that an illumination plane defined by said wall 40 to be illuminated and the intermediate axis I are substantially parallel.

According to one embodiment, the first optical surface 22 of each shaping structure 20 defines an optical plane substantially parallel to the intermediate axis I. Such an arrangement allows a deviation angle ranging from 1° to 89°. Indeed, each emergent light beam 32 from each shaping structure 20 is therefore oriented so as not to illuminate the adjacent shaping structures 20. Within the meaning of the present disclosure, substantially parallel means parallel to within 5°.

According to one embodiment, each shaping structure 20 of the plurality of shaping structures 20 extends in a continuous and derivable manner according to a sinusoidal elementary pattern which is repeated along the extension direction D. Such an arrangement has the effect of spreading the light in the extension direction D and thus makes it possible to avoid too high concentration of the light as well as too narrow common area, as represented in FIG. 7. Thanks to the absence of discontinuities, such an arrangement makes it possible to avoid the projections of light artifacts on the surface 40 to be illuminated.

Within the meaning of the present disclosure, the term "extends in a continuous manner" means "forms a continuous curve".

Within the meaning of the present disclosure, the term "extends in a derivable manner" means "forms a continuous and derivable curve, with continuous derivative".

According to one embodiment, the derivative of the pattern is continuous. According to one embodiment, each shaping structure 20 of the plurality of shaping structures 20 extends according to a non-derivable pattern. Such an arrangement facilitates the machining of the diffusion device 10.

According to one embodiment, each shaping structure of the plurality of shaping structures extends in a discontinuous manner.

According to one embodiment, the elementary pattern is substantially a B-spline.

According to one embodiment, the elementary pattern is substantially an arc of a circle.

According to one embodiment, the elementary pattern is substantially a conic.

As represented in FIGS. 4, 5 and 6, the shaping device 10 comprises collimating optics 50 configured to obtain the primary light beam 30 from an incident light beam 28. Such an arrangement makes it possible to obtain a complete and compact diffusion device 10. By such an arrangement a zoom effect can be easily obtained. Indeed, a diffusion device according to the disclosure makes it possible to obtain an enlarged emergent beam by bringing closer a light source 60 emitting the incident beam 28.

More particularly, FIG. 4 represents a shaping device 10 comprising collimating optics 50 particularly suitable for a light source 60 of the individual LEDs commonly called "chip-on-board" assembly type, whereas FIG. 5 represents a shaping device comprising collimating optics 50 particularly suitable for a light source 60 of the individual LED type, LED being the English acronym for light-emitting diode.

According to one embodiment, the collimating optics 50 and the plurality of shaping structures 20 are formed from a single, one-piece mechanical part. The single, one-piece mechanical part being made of any optical material such as polymethyl methacrylate or PMMA, commonly called acrylic, polycarbonate or PC, thermoplastic, or even optical silicone.

Such an arrangement makes it possible to simplify the manufacture of the device by having only one optical component to be assembled.

According to one embodiment, the shaping device comprises a light source 60 configured to provide the incident light beam 28.

According to one embodiment, the plurality of shaping structures 20 consists of a plurality of shaping sub-assemblies, with each shaping sub-assembly comprising a plurality of shaping structures 20 such that at least two shaping sub-assemblies are configured to shape the emergent light beam 32 on at least the common area of the wall 40 to be illuminated. Such an arrangement allows good homogeneity of the illumination of the wall 40 to be illuminated. Indeed, such a diffusion device makes it possible to shape the beam originating from the collimation optics 50 in a homogeneous manner on the wall 40 to be illuminated. Such an arrangement makes it possible to simplify the architecture of the first and second optical surfaces 22, 24 composing the subsets.

Within the meaning of the present disclosure, a collimating optic means a collimator.

According to one embodiment, the geometry of the first and second optical surfaces can be calculated using 3D optical engineering and design software such as "Light-Tools" for example.

Of course, the present disclosure is not limited to the embodiments represented and described above, but on the contrary covers all variants thereof.

The invention claimed is:

1. A shaping device, comprising:
a light incident surface configured to receive a primary light beam, and defining a main axis substantially normal to a plane of the light incident surface, and
a plurality of shaping structures, each shaping structure of the plurality of shaping structures comprising at least one first optical surface configured to output emergent beams in a direction at an angle to the main axis,
wherein the plurality of shaping structures are regularly distributed along a spacing axis substantially perpendicular to the main axis, and extend longitudinally along an extension direction substantially perpendicular to the main axis and to the spacing axis, and
wherein each shaping structure of the plurality of shaping structures extends in a regular pattern that is substantially sinusoidal and repeated along the extension direction.

2. The device according to claim 1, each shaping structure of the plurality of shaping structures further comprises a second optical surface configured to reflect the primary light beam by total internal reflection.

3. The device according to claim 1, wherein the at least one first optical surface defines an optical plane substantially parallel to the main axis.

4. The device according to claim 1, wherein the plurality of shaping structures comprises at least 10 shaping structures.

5. The device according to claim 1, wherein the plurality of shaping structures consists of a plurality of shaping sub-assemblies, with each shaping sub-assembly comprising a plurality of shaping structures wherein at least two shaping sub-assemblies of the plurality of shaping sub-assemblies are configured to shape respective emergent light beams on at least one common area of a wall to be illuminated.

6. The device according to claim 1, wherein each shaping structure of the plurality of shaping structures extends in a continuous manner.

7. The device according to claim 6, wherein each shaping structure of the plurality of shaping structures extends along a derivable curve.

8. The device according to claim 1, wherein the device comprises collimating optics configured to obtain the primary light beam from an incident light beam.

9. The device according to claim 8, wherein the collimating optics and the plurality of shaping structures are formed from a single, one-piece mechanical part.

10. The device according to claim 8, wherein the device comprises a light source configured to provide the incident light beam.

11. The device according to claim 10, wherein the light source is a light emitting diode.

12. The device according to claim 1, wherein the plurality of shaping structures are identical.

13. The device according to claim 12, each shaping structure of the plurality of shaping structures further comprises a second optical surface configured to reflect the primary light beam by total internal reflection.

14. The device according to claim 13, wherein the at least one first optical surface of each shaping structure defines an optical plane substantially parallel to the main axis.

15. The device according to claim 14, wherein the plurality of shaping structures comprises at least 10 shaping structures.

* * * * *